United States Patent [19]

Tagami

[11] Patent Number: 5,251,031
[45] Date of Patent: Oct. 5, 1993

[54] DISPLAY CONTROL SYSTEM
[75] Inventor: Fumitaka Tagami, Kanagawa, Japan
[73] Assignee: Mitsubishi Denki Kabushiki Kaisha, Tokyo, Japan
[21] Appl. No.: 667,963
[22] Filed: Mar. 12, 1991
[30] Foreign Application Priority Data Mar. 13, 1990 [JP] Japan ................................. 2-61641

[51] Int. Cl.$^5$ ............................................. H04N 3/227
[52] U.S. Cl. .................................... 358/139; 358/148; 358/158
[58] Field of Search ................ 358/141, 142, 147, 148, 358/150, 139; 340/724, 747, 748

[56] References Cited
FOREIGN PATENT DOCUMENTS 0224789 10/1986 Japan .
0058090 2/1990 Japan ................................. 358/148

*Primary Examiner*—James J. Groody
*Assistant Examiner*—David E. Harvey
*Attorney, Agent, or Firm*—Wolf, Greenfield & Sacks

[57] ABSTRACT

A display control method of adjusting the position of an image to be displayed is disclosed. The method includes the steps of generating a composite video signal by combining a video signal obtained during a display period of a vertical synchronizing signal with a display position signal obtained during a blanking period of the vertical synchronizing signal; separating the composite video signal into a reproduced video signal and a reproduced display position signal in accordance with the display period and the blanking period of the vertical synchronizing signal; detecting a difference in phase between the reproduced display position signal and a horizontal synchronizing signal; generating a timing adjusting signal for the horizontal synchronizing signal in accordance with the detected phase difference; and adjusting the position of the image to be displayed in accordance with the timing adjusting signal.

4 Claims, 4 Drawing Sheets

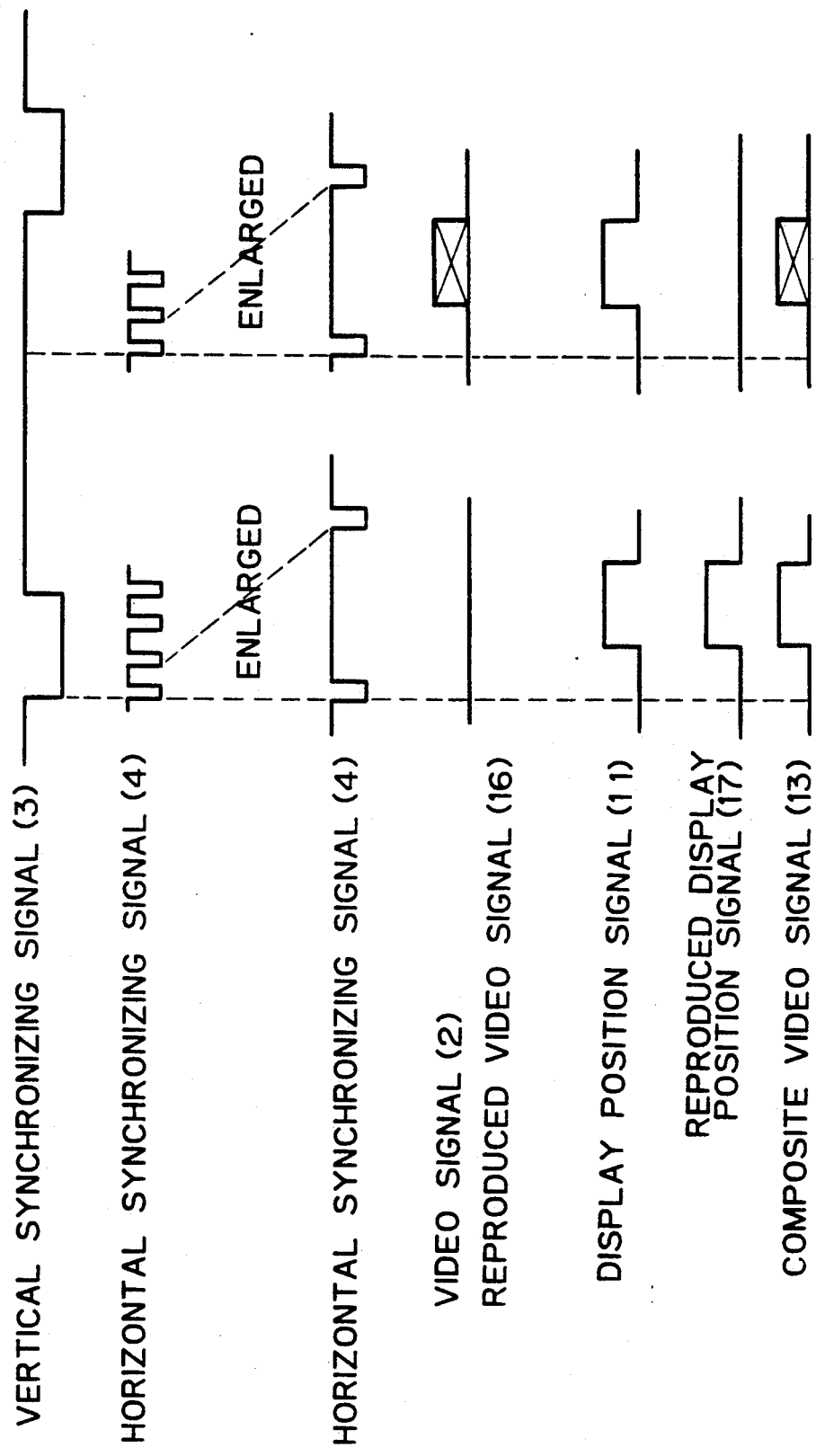

DISPLAY CONTROL SYSTEM

BACKGROUND OF THE INVENTION

1. Field of the Invention

The present invention relates to a display control system for a raster-scanning type display unit having the function of automatically adjusting the image display position on a screen on the basis of the difference in phase between a horizontal synchronizing signal and a display position signal.

2. Description of the Related Art

FIG. 1 shows a conventional display control system. In FIG. 1, a reference numeral 1 denotes a display control circuit for generating horizontal and vertical synchronizing signals and a video signal for display; 2, a video signal; 3, a vertical synchronizing signal; 4, a horizontal synchronizing signal; 5, a video control circuit; 6, a vertical deflection circuit; 7, a horizontal deflection circuit; 8, a cathode-ray tube; 9, a display control unit; and 10, a display unit.

FIG. 2 shows a horizontal synchronizing signal and a video signal which are output from the conventional display control system. In FIG. 2, reference numerals 4a and 2a respectively denote a horizontal synchronizing signal and a video signal which are output in the display mode 'a'.

Reference numerals 4b and 2b respectively denote a horizontal synchronizing signal and a video signal which are output in the different display mode 'b'.

In the above-described display control system, the display unit 10 is adjusted such that it displays the video signal 2a at the center of the screen by the relative timing between the horizontal synchronizing signal 4a and the video signal 2a. Therefore, when the horizontal synchronizing signal 4b and the video signal 2b which provide a different relative timing are supplied to the display unit 10, since the video signal 2b is displayed at the position on the screen which is adjusted on the basis of this relative timing, the video signal is displayed off the center position by the distance equal to the difference "t" between the relative timings of the signals 4a, 2a and 4b, 2b.

In the thus-arranged conventional display control system, in order to cope with the display modes having different timings, separate display units corresponding to the individual timings must be connected to the display control unit. Furthermore, signal interfaces which adopt different signal transmission methods must be provided on both the display control unit and the display unit and then a signal cable is provided between the units. These make the entire structure of the system complicated and expensive.

SUMMARY OF THE INVENTION

An object of the present invention is to provide a display control system in which signals in a plurality of display modes having different horizontal timings can be displayed on a signal display unit and in which the display position of the signals in the different display modes can be centered without special signal cable being provided between the control unit and the display unit.

To this end, the present invention provides a display unit which comprises: a display control unit having a display control circuit for outputting a display position signal, a video signal, a vertical synchronizing signal and a horizontal synchronizing signal, and a combining circuit for combining the video signal input during the display period of the vertical synchronizing signal and the display position signal input during the blanking period and outputting a composite video signal; and a display unit having a signal separation reproduction circuit for separating the composite video signal into a video signal and a display position signal in accordance with the period of the vertical synchronizing signal, and a horizontal timing detecting circuit for detecting a difference in phase between the reproduced display position signal and the horizontal synchronizing signal and for outputting to a horizontal deflection circuit a timing adjusting signal for the horizontal synchronizing signal such that an image to be displayed is centered on the screen.

In the present invention, the composite video signal generated by combining the display position signal and the video signal is transmitted from the display control unit to the display unit. In the display unit, the display position signal is separated from the composite video signal by means of the separation reproduction circuit. The reproduced display position signal is output to the horizontal timing detection circuit which detects a difference in phase between the display position signal and the horizontal synchronizing signal and which thereafter outputs to the horizontal deflection circuit a timing signal in accordance with the phase difference to display the image at the center of the screen.

According to the present invention, since the display position of the screen is detected and corrected in accordance with the display timings, the images in the plurality of display modes can be displayed at the center of the screen of the signal display unit. Furthermore, since the display position signal required for correction of the display timing is output in the form of a composite video signal, special signal interfaces for connecting the display control unit and the display unit are not required. This makes the display control system simple and inexpensive.

BRIEF DESCRIPTION OF THE DRAWINGS

FIG. 4 shows the timing of individual signals employed in the display control system according to the present invention.

DETAILED DESCRIPTION OF THE PREFERRED EMBODIMENT

Figure 3:
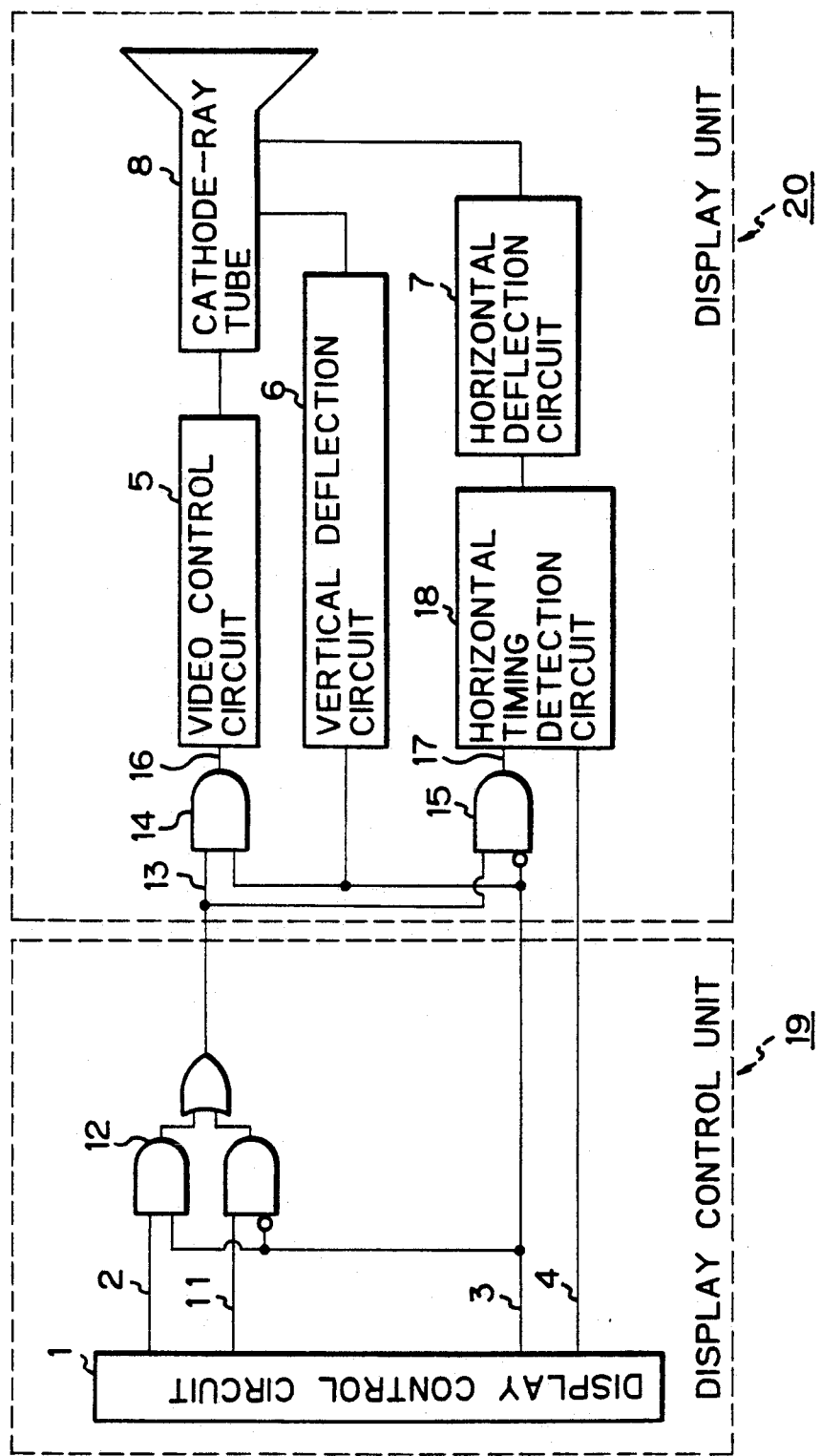
FIG. 3 shows an embodiment of the display control system according to the present invention.

An embodiment of the present invention will now be described with reference to FIGS. 3 and 4. In FIG. 3, a reference numeral 11 denotes a display position signal which is at the logical high level during the effective period of the video signal; 12, a combining circuit for combining the video signal 2 with the display position signal 11 and for outputting a composite video signal 13; 14, a video separating circuit for separating a reproduction video signal 16 from the composite video signal 13; 15, a separating circuit for separating a reproduction display position signal 17 from the composite video signal 13; 18, a horizontal timing detecting circuit for detecting a difference in phase between the horizontal synchronizing signal 4 and the reproduction display position signal 17 from the relative position of the two signals or the widths thereof and for giving to a horizontal deflection circuit 7 an instruction of adjusting the horizontal timing such that the image to be displayed is centered on the screen; 19, a display control unit; and 20, a display unit.

FIG. 4 shows the timing of the individual signals used in the display control system of the present invention.

The operation of the display control system will be described now. The video signal 2 output from the display control circuit 1 which constitutes the display control unit 19 becomes effective during the time in which the vertical synchronizing signal 3 is at the logical high level and is input to the combining circuit 12. The display position signal 11 becomes effective during the time in which the vertical synchronizing signal 3 is at the logical low level (during blanking period) and is input to the combining circuit 12. The composite video signal 13 generated by the combining circuit 12 is input to both the video separating circuit 14 and the separating circuit 15. When the vertical synchronizing signal 3 is at the logical high level, the reproduced video signal 16 is separated by the video separating circuit 14 and input to the video control circuit. When the vertical synchronizing signal 3 is at the logical low level, the reproduced display position signal 17 is input from the separating circuit 15 to the horizontal timing detecting circuit 18. The horizontal timing detecting circuit 18 detects the relative position between, or the widths of, the horizontal synchronizing signal 4 and the reproduced display position signal 17 when the vertical synchronizing signal 3 is at the logical low level, retains the information, and cyclically gives to the horizontal deflection circuit 7 an instruction of adjusting the timing such that the image to be displayed is centered on the screen in the display period. FIG. 4 shows the timing and the waveforms of these signals.

More specifically, when the vertical synchronizing signal 3 is at the logical low level, only the display position signal 11 becomes effective and is input to the video combining circuit 12 and then to the separating circuit 15 in the form of the composite video signal 13 from the OR gate of the video composite circuit 12. Thereafter, when the vertical synchronizing signal 3 is again at the logical low level, the reproduced display position signal 17 generated by the separating circuit 15 is input to the horizontal timing detection circuit 18.

When the vertical synchronizing signal 3 is at the logical high level, only the video signal 2 becomes effective and is input to the video combining circuit 12 and then to the video separating circuit 14 in the form of the composite video signal 13 from the OR gate. Thereafter, when the vertical synchronizing signal 3 is again at the logical high level, the reproduced video signal 16 generated by the video separting circuit 14 is input to the video control circuit 5.

As described above, when the vertical synchronizing signal 3 is at the logical low level, the horizontal timing detection circuit 18 detects the phase difference between the reproduced display position signal and the horizontal synchronizing signal 4, retains it, and gives to the horizontal deflection circuit an instruction of adjusting the horizontal timing such that the image to be displayed is centered on the screen. Hence, the image generated by the reproduced video signal 16, which is output when the vertical synchronizing signal 3 is at the logical high level, is centered on the screen by means of the horizontal deflection circuit 7.

Figure 1:
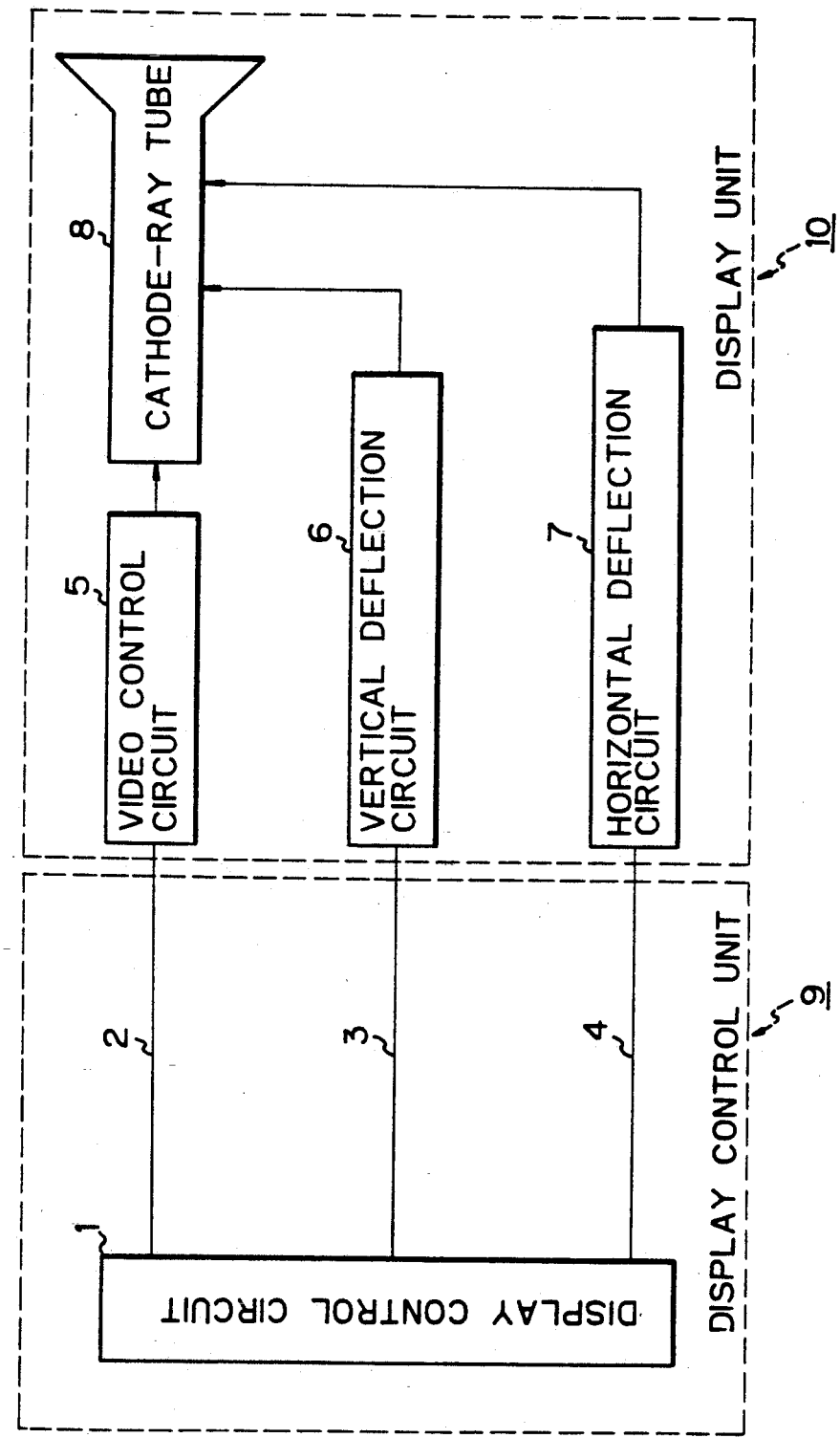
FIG. 1 shows a conventional display control system.
Figure 2:
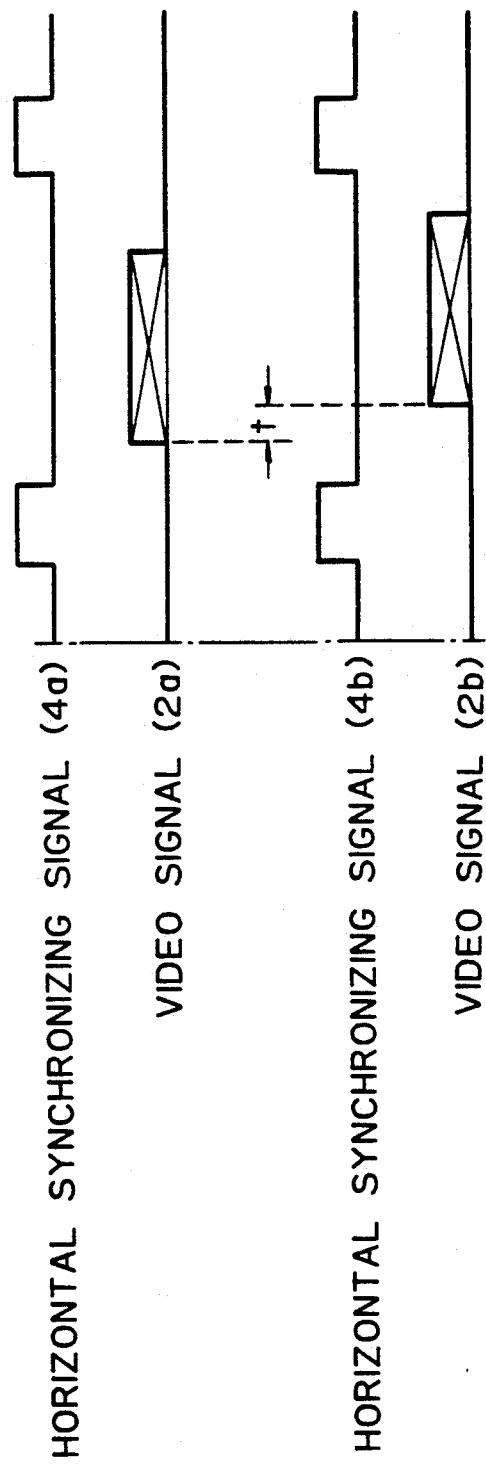
FIG. 2 shows the timing of a horizontal synchronizing signal and of a video signal in the display modes 'a' and 'b'.

In a case where signals having different horizontal display timings such as those shown in FIG. 2 are to be displayed, the display position signals 11 which represent the timings for the display modes 'a' and 'b' are output from the display control circuit 1. However, the horizontal timing detection circuit 18 always detects the phase difference between the signals and gives an instruction of adjusting the timing such that the image is centered on the screen to the horizontal deflection circuit 7.

Thus, it is possible to display the images at the center of the screen in both display modes, 'a' and 'b ' having different timings.

What is claimed is:

1. A display control method of adjusting the position of an image to be displayed, comprising the steps of:
   (a) generating a composite video signal by combining a video signal obtained during a display period of a vertical synchronizing signal with a display position signal obtained during a blanking period of the vertical synchronizing signal;
   (b) separating said composite video signal into a reproduced video signal and a reproduced display position signal in accordance with the display period and the blanking period of the vertical synchronizing signal;
   (c) detecting a difference in phase between said reproduced display position signal and a horizontal synchronizing signal;
   (d) generating a timing adjusting signal for the horizontal synchronizing signal in accordance with the detected phase difference;
   (e) displaying the reproduced video signal to form the image; and
   (f) adjusting the position of the image in accordance with the timing adjusting signal.

2. A display control system comprising:
   a display control unit including:
   (a) a display control circuit means for outputting a display position signal, a video signal, a vertical synchronzing signal and a horizontal synchronizing signal; and
   (b) a combining circuit means for receiving the video signal, the vertical synchronizing signal and the display position signal and for outputting a composite video signal, the composite video signal corresponding to the video signal when the vertical synchronizing signal is in a display period, the composite video signal corresponding to the display position signal when the vertical synchronizing signal is in a blanking period; and
   a display unit including a video control circuit means, a vertical deflection circuit means and a horizontal deflection circuit means, said display unit for conducting a display on a display means, said display unit further including:
   (a) separating means for receiving the composite video signal and for separating the composite video signal into a reproduced video signal during the display period of the vertical synchronizing signal and into a reproduced display position signal during the blanking period of the vertical synchronizing signal;
   (b) means for coupling the separating means to the display such that the reproduced display signal is sourced to the display means and displayed thereon to form the image;

(c) a horizontal timing detection circuit means for receiving and detecting a difference in phase between said reproduced display position signal and said horizontal synchronizing signal, and for outputting a timing adjusting signal for said horizontal synchronizing signal to said horizontal deflection circuit means such that an image to be displayed is centered on the display means.

3. A display control method of adjusting the position of an image displayed on a display, comprising the steps of:

(a) generating a composite video signal by combining a video signal obtained during a display period of a vertical synchronizing signal with a display position signal obtained during a blanking period of the vertical synchronizing signal;

(b) separating the composite video signal into a reproduced video signal during the display period of the vertical synchronizing signal, and into a reproduced display position signal during the blanking period of the vertical synchronizing signal;

(c) detecting a difference in phase between said reproduced display position signal and a horizontal synchronizing signal;

(d) generating a timing adjusting signal for the horizontal synchronizing signal based upon the detected phase difference;

(e) displaying the reproduced video signal on the display to form the image; and (f) adjusting the position of the image on the display in accordance with the timing adjusting signal.

4. A display control system for controlling the display of an image on a display, comprising:

a display control circuit means for outputting a display position signal, a video signal, a vertical synchronizing signal and a horizontal synchronizing signal;

a combining circuit means for receiving the video signal, the vertical synchronizing signal and the display position signal and for outputting a composite video signal, the composite video signal corresponding to the video signal when the vertical synchronizing signal is in a display period and corresponding to the display position signal when the vertical synchronizing signal is in a blanking period; and a display unit including separating means for receiving the composite video signal and for separating the composite video signal into a reproduced video signal during the display period of the vertical synchronizing signal and into a reproduced display position signal during the blanking period of the vertical synchronizing signal;

a video control circuit means, coupled to the display, for receiving the reproduced video signal and for sourcing it to the display such that it is displayed to form the image;

a vertical deflection circuit means, responsive to the vertical synchronization signal, for controlling vertical deflection of the display;

a horizontal timing detection circuit means for receiving and detecting a difference in phase between the reproduced display position signal and the horizontal synchronizing signal, and for outputting a timing adjusting signal for said horizontal synchronizing signal based upon the detected phase difference; and a horizontal deflection circuit means, coupled to the display, for receiving the timing adjusting signal and for centering the image on the display based upon the timing adjusting signal.

* * * * *